Jan. 31, 1933.  T. BROWN  1,895,648
CULTIVATOR
Filed Aug. 13, 1926  6 Sheets-Sheet 1

Witness
Milton Lenoir

Inventor.
Theophilus Brown,
By John L. Jackson.
Attorney.

Jan. 31, 1933.　　　　　T. BROWN　　　　　1,895,648
CULTIVATOR
Filed Aug. 13, 1926　　　　6 Sheets-Sheet 2
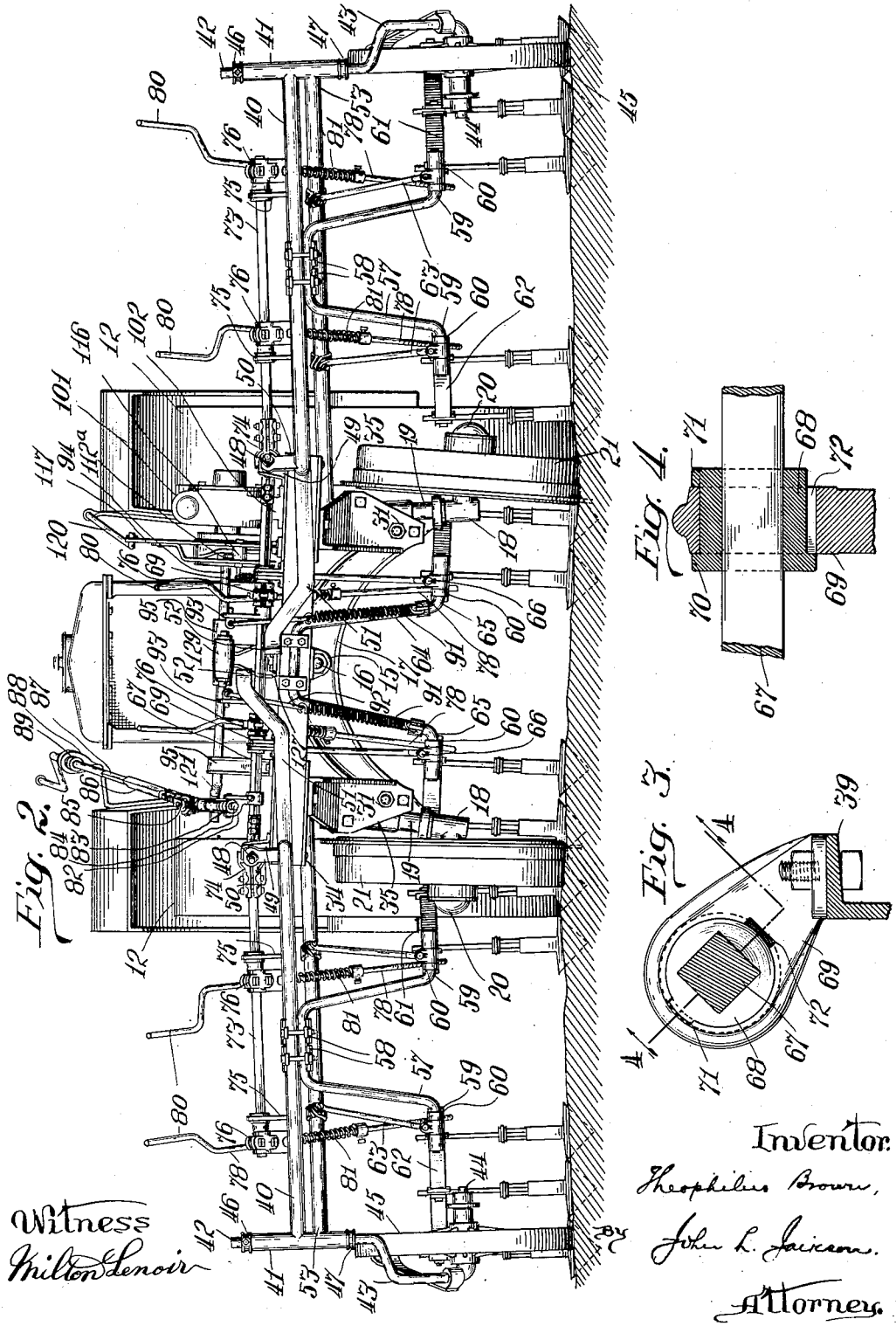

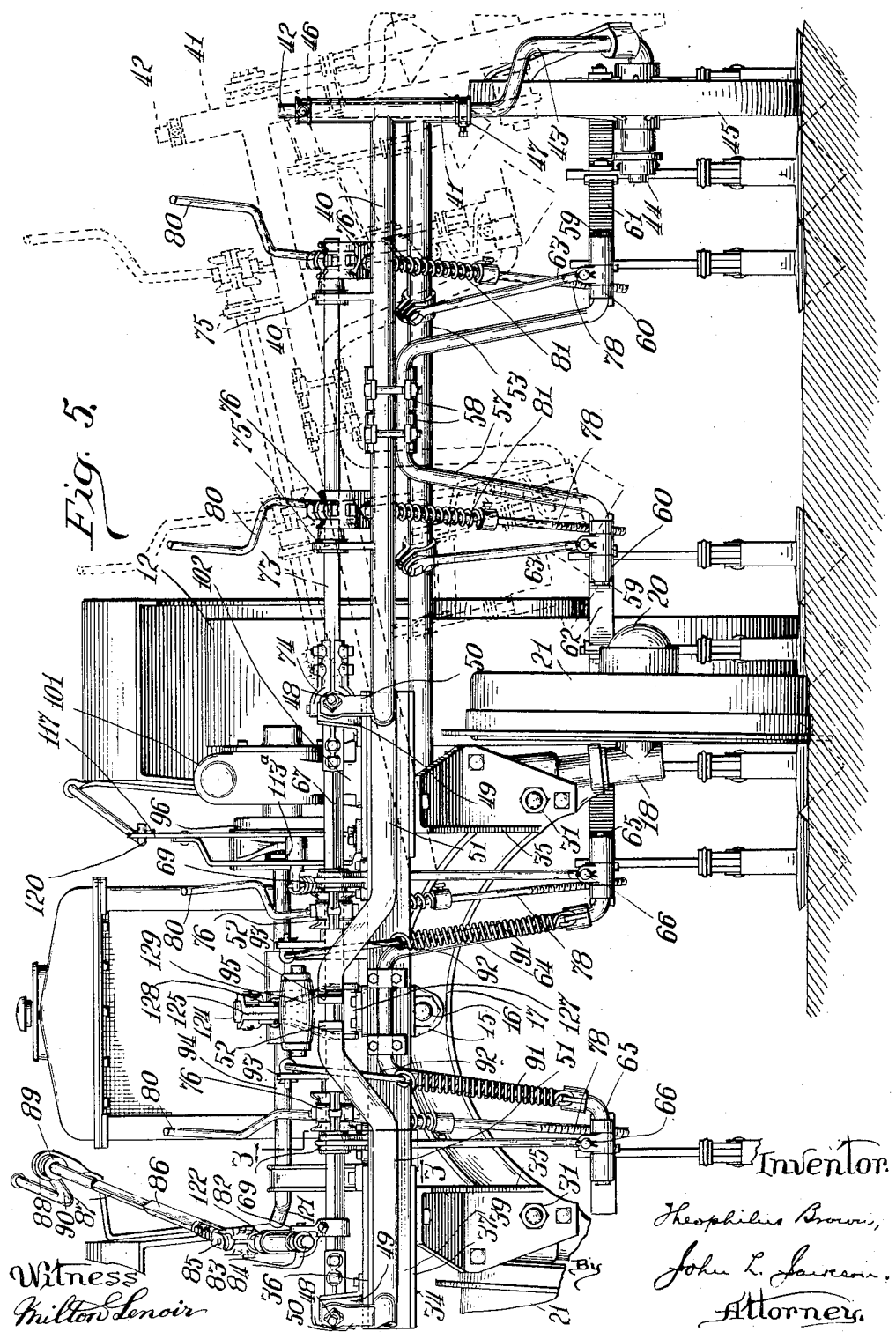

Jan. 31, 1933.  T. BROWN  1,895,648
CULTIVATOR
Filed Aug. 13, 1926   6 Sheets-Sheet 4

Inventor:
Theophilus Brown,
John L. Jackson.
Attorney.

Witness
Milton Lenoir

Jan. 31, 1933.  T. BROWN  1,895,648
CULTIVATOR
Filed Aug. 13, 1926  6 Sheets-Sheet 5
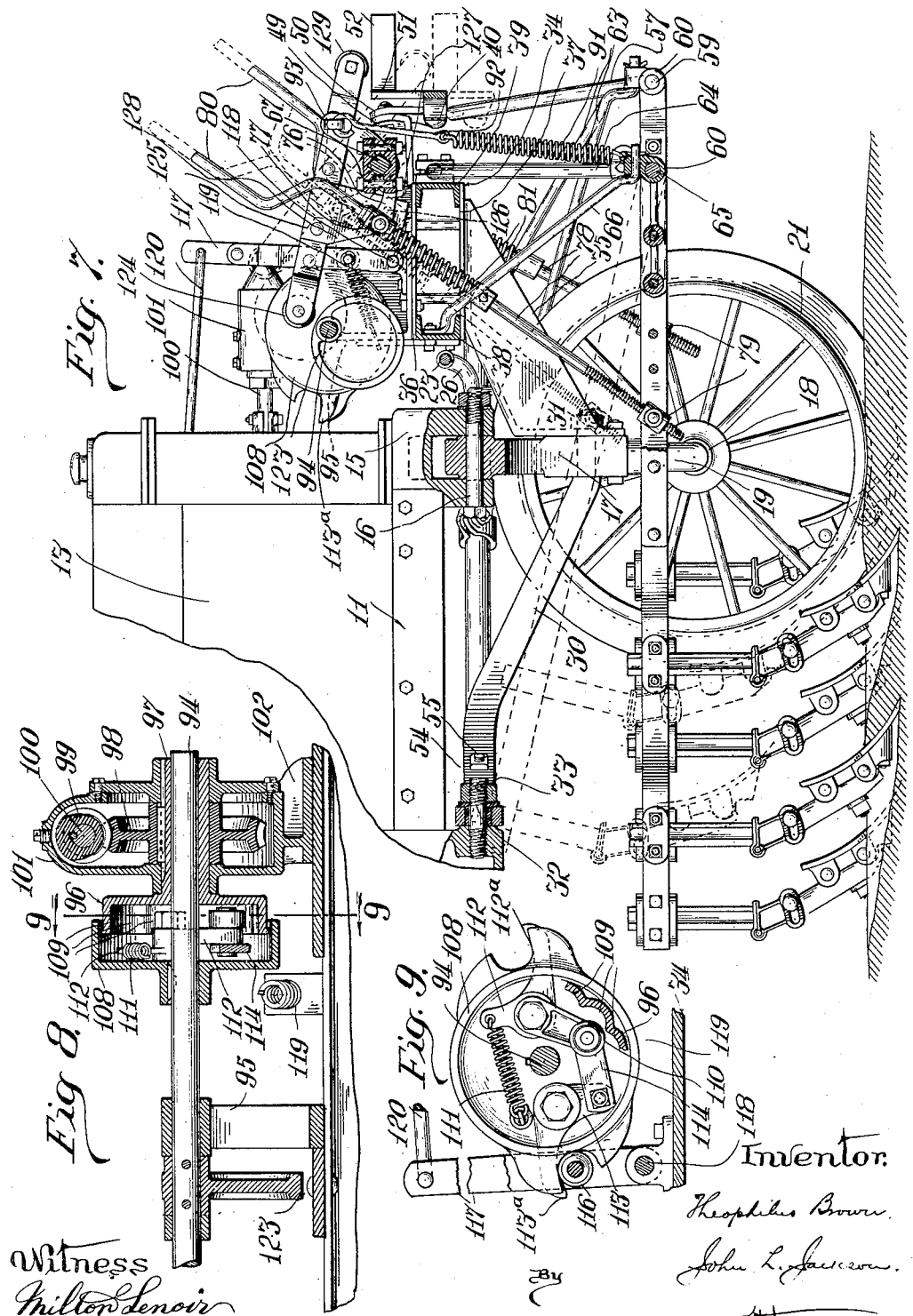

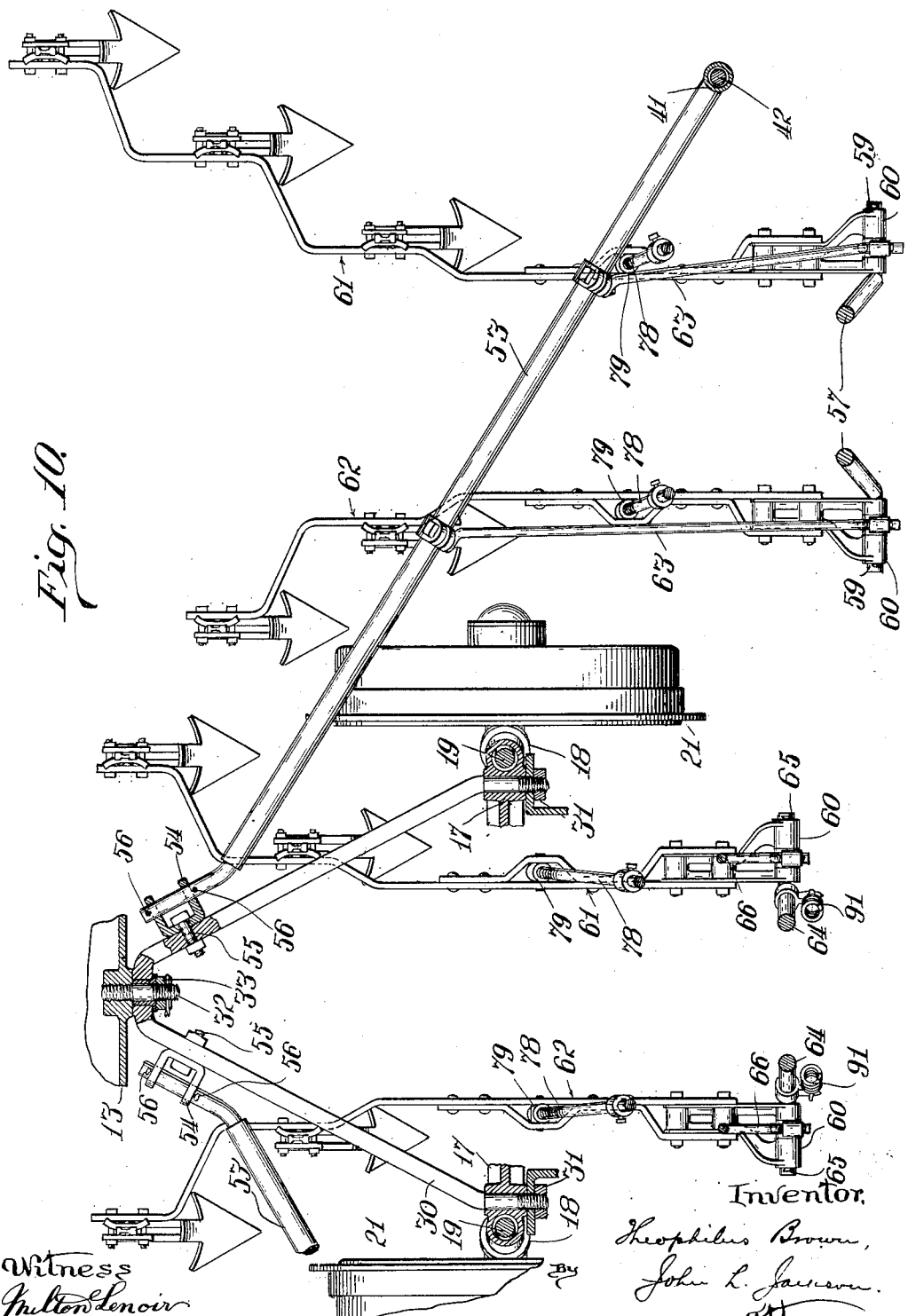

Patented Jan. 31, 1933

1,895,648

UNITED STATES PATENT OFFICE

THEOPHILUS BROWN, OF MOLINE, ILLINOIS, ASSIGNOR TO DEERE & COMPANY, OF MOLINE, ILLINOIS, A CORPORATION OF ILLINOIS

CULTIVATOR

Application filed August 13, 1926. Serial No. 128,929.

My invention relates to cultivators generally, but in the embodiment thereof shown in the accompanying drawings it has more particularly to do with power lift cultivators, or analogous implements of the type shown and described in my pending application, Serial No. 126,122, filed July 31, 1926, characterized by the provision of means for raising the several rigs of the cultivator simultaneously out of operative position, and restoring them to a predetermined operative position, by mechanical power, and also by the provision of manually operated means for adjusting the rigs to operate at the desired depth, and independently operable means for setting the several rigs independently of each other to operate at the same or different depths, of such character that after the rigs have been set they may be raised or lowered in unison, either by power, or manually, without disturbing their setting. My present invention has for its object to provide certain improvements in such cultivators by which, in addition to the raising and lowering of the cultivator rigs as above described, the end portions of the cultivator frame, as distinguished from the frame of the tractor by which the cultivator as an entirety is propelled, may be swung upward about longitudinal axes clear of the ground for transport purposes. As further improvements it is also my object to provide power operated means for effecting such upward swinging of the end portions of the cultivator frame, and to simultaneously or coincidently swing the cultivator rigs upward about a transverse axis through the action of such power operated means. In addition to the foregoing, my invention also has for its object to provide a cultivator in which the end portions of the cultivator frame are capable of swinging vertically, or about longitudinal axes, to enable the rigs connected therewith to conform to inequalities in the ground; also to provide wheel supports for the outer end portions of the cultivator frame, and to improve cultivators of this description in various other respects that will be pointed out more specifically hereinafter. I accomplish these objects as illustrated in the drawings and as hereinafter described. What I regard as new is set forth in the claims.

My improved cultivator comprises a propelling element in the form of a tractor, propelled by any suitable power such as an internal combustion motor, having propelling wheels at the rear and steering wheels at the front, the steering wheels being mounted to turn about vertical spindles for steering purposes in a manner similar to the front wheels of an automobile. The vertical spindles of the steering or dirigible wheels are mounted in the opposite end portions of a front axle, which is pivotally connected with the front portion of the tractor frame to rock about a longitudinal axis so that the steering wheels may adapt themselves to the contour of the ground, and such wheels are controlled through connections provided with universal joints, so that they may be steered from the driver's seat, notwithstanding the rocking of the front axle about its pivotal connection with the tractor frame.

The cultivator unit, or attachment, as distinguished from the propelling unit or tractor, in the illustrated construction, comprises a frame, the central portion of which constitutes the main cultivator frame, and is rigidly connected with the front axle, so that it swings therewith about a longitudinal axis. The front axle therefore in effect is a part of the cultivator frame, which is directly supported by the steering wheels. Such central portion of the cultivator frame is provided at its ends with laterally extending rig carrying members, or extensions that serve individually as draft members, and together constitute an extended draft member the individual elements of which project at opposite sides of the tractor. These individual draft members are pivotally connected with the central portion of the cultivator frame to swing vertically with reference thereto about longitudinal axes, preferably positioned approximately in line with the steering wheels. The outer end portions of said frame extensions or draft members are supported on ground engaging supporting means, preferably in the form of caster wheels, and are braced from the front axle by rearwardly converging thrust bars that are pivotally connected with a rearwardly extending yoke that is rigidly connected with the front axle and extends back to a point where it is pivotally connected with the tractor frame. Such yoke serves as a brace for the front axle, and also to take the end thrust of said thrust bars. The connections between the thrust bars and said yoke are such that said thrust bars are permitted to swing upward and downward with the frame extensions.

Mounted on the central portion of the cultivator frame is a transversely disposed rock shaft having extensions connected with its opposite ends by universal joints, and the front ends of the cultivator rigs are connected with said rock shaft and its extensions in such manner that by rocking the rock shaft the rigs may be raised or lowered in unison. Separate means is also provided for adjusting the individual rigs vertically independently of each other. The connections between the rock shaft and its extensions coincide with the connections between the central portion of the cultivator frame and its extensions, on which latter the rock shaft extensions are supported, so that said rock shaft extensions are capable of swinging upward when the extensions of the cultivator frame are correspondingly moved.

The central portion of the cultivator frame forms a support for power operated means, of the same general type as that shown and described in my said pending application, for raising and lowering the cultivator rigs in unison, either by power or manually, and in addition to such means it also supports mechanism by which the frame extensions, with the rock shaft extensions supported thereon, may be swung upward or downward by power furnished preferably from the power plant of the tractor. In this connection it should be understood that while I have shown and described a construction in which the motor that propels the tractor supplies the power for lifting the cultivator rigs in the several ways above mentioned, my invention is not limited to that construction, but includes the use of a separate motor or other source of power for doing that work.

Referring now to the drawings for a detailed description of the embodiment of my invention illustrated therein, which is a three-row cultivator,—

Fig. 2 is a front elevation thereof with the parts somewhat disalined to show the adaptability of the cultivator to conform to inequalities in the ground;

Fig. 3 is a detail, being a partial longitudinal vertical section on line 3—3 of Fig. 5;

Fig. 4 is a detail, being a section on line 4—4 of Fig. 3;

Fig. 5 is a partial front elevation showing the normal position of the parts in full lines, and illustrating in dotted lines their position when the extensions of the cultivator frame are swung upward;

Fig. 7 is a partial central longitudinal vertical section;

Fig. 8 is a partial vertical section on line 8—8 of Fig. 6;

Fig. 9 is a vertical section on line 9—9 of Fig. 8; and

Fig. 10 is a partial horizontal section on line 10—10 of Fig. 6, showing some of the rigs in plan.

Figure 1:
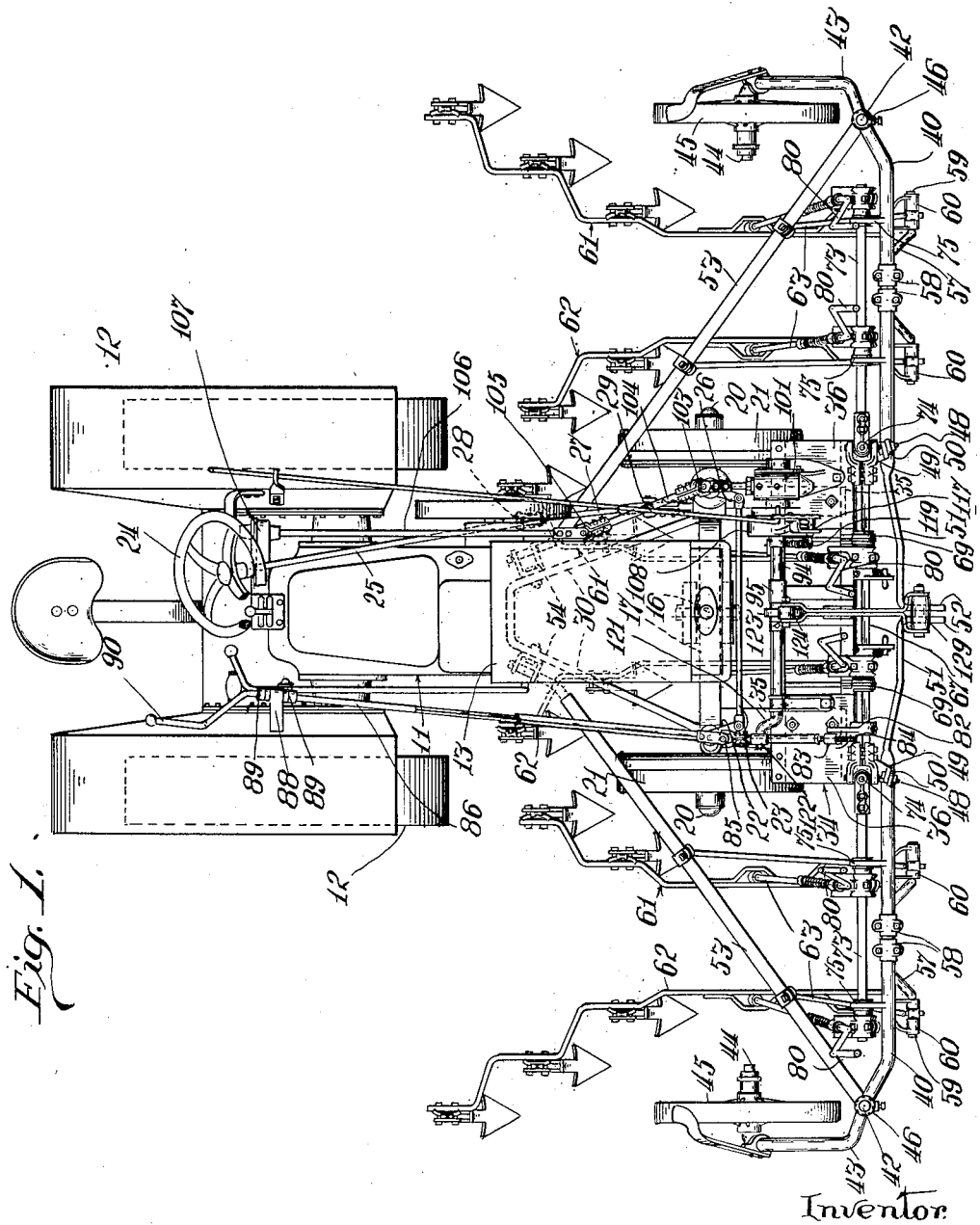
Fig. 1 is a plan view of my improved cultivator.

My improved cultivator comprises a main or tractor frame 11, of any design suitable to support the parts of the implement, and supported at the rear by traction wheels 12 arranged to be propelled by a motor mounted on said frame and enclosed in a housing 13 as usual. Preferably I employ a motor having a transversely disposed crank shaft 14 indicated in Fig. 6, and having the construction shown and described in the pending application of Louis W. Witry, Serial No. 682,401; any other suitable tractor may, however, be employed. As best shown in Fig. 7, the tractor frame 11 is provided at its front end with a centrally disposed downwardly turned yoke 15 on which is mounted a pivot pin 16, that extends fore and aft, and forms a pivotal connection between the tractor frame and an arched front axle 17, as best shown in Figs. 2 and 7. As shown in Fig. 2, the axle 17 is provided at its ends with vertically disposed journal boxes 18 in which are journaled upright spindles 19, at the lower ends of which are approximately horizontal spindles 20 on which are mounted the front steering wheels 21. Preferably the vertical spindles 19 converge slightly upwardly and the horizontal spindles 20 are inclined slightly downwardly as shown in Fig. 2 so that the swiveling axis of each wheel is along a line intersecting the rim of the wheel intermediate its lateral edges. While this construction is preferred it is not, however, essential. Said upright spindles are provided at their upper ends with cranks 22 that are connected by a connecting bar 23 shown in Fig. 1, so that they are turned in unison for steering purposes. Said wheels are steered by means of a hand wheel 24 located so that it is conveniently accessible to the operator at the rear of the tractor, as shown in Fig. 1, said steering wheel being mounted on a longitudinally extending steering rod 25 flexibly connected with the usual crank 26 carried by one of the steering wheel spindles. This flexible connection is obtained by the use of one or more intermediate rods 27 and universal joints 28, 29, as shown in Fig. 1. It will be understood that any suitable means may be used providing a flexible connection between the steering rod 25 and the crank 26, so that the rocking movement of the front axle about a longitudinal axis may take place without disturbing the steering connections.

As best shown in Figs. 7 and 10, the end portions of the front axle 17 are braced by a yoke 30 in the form of a V-shaped rod, the separated front end portions of which extend through the upright portions of the front axle adjacent to the journal bearings 18, and are secured by nuts 31, while the apex of said yoke is pivotally connected with the central portion of the tractor frame 13 by a pivot 32, and a nut 33. The pivot 32 is substantially alined with the pivot 16, as best shown in Fig. 7, but the end portions of the yoke 30 preferably extend downward and are connected with the front axle at a lower point, as shown in said figure. By this construction the front truck of the tractor, which in the present instance comprises the steering wheels and the front axle, may swing about a longitudinal axis with respect to the tractor frame, but it is held against swinging about a vertical axis.

The cultivator unit is carried by the front truck of the tractor, and it comprises a frame made up of an intermediate or central portion 34, rigidly secured to the end portions of the front axle so that it rocks therewith about a longitudinal axis, by brackets 35, as shown in Figs. 2 and 7. Said brackets extend forward and upward from the front axle, as shown in Fig. 7, so that the cultivator frame is supported at the proper height and at a point slightly in advance of the front of the tractor frame. Preferably the intermediate portion of the cultivator frame is made up of upper and lower plates 36, 37 connected at their front and rear margins by channel bars 38, 39, as shown in Fig. 7, said plates being secured to the end portions of said channel bars to leave an open space between their inner margins, as shown in Fig. 1. The precise manner in which said frame is constructed may, of course, be varied, but I prefer the construction illustrated. This intermediate frame element extends transversely of the central portion of the cultivator, its length being approximately equal to the width of the space between the steering wheels, and at its opposite ends it is provided with draft members in the form of hinged extension 40 articulated so that they are arranged to float or swing freely vertically at the sides of the tractor about longitudinal axes. As the two cultivator frame extensions or draft members are alike and the parts connected with each of said extensions are similar to those connected with the other, the same reference numerals will be used to indicate like parts at each side of the cultivator.

Each of such frame extensions comprises a bar, preferably tubular, provided at its outer end with a vertically disposed sleeve 41 to receive the spindle 42 of a caster wheel support 43, said support having at its lower end a horizontal spindle 44 on which a caster wheel 45 is mounted. A collar 46 secured to the spindle 42 above the sleeve 41, and a similar collar 47 secured to said spindle below said sleeve hold the caster wheel support in place, but permit it to rotate freely.

Figure 6:
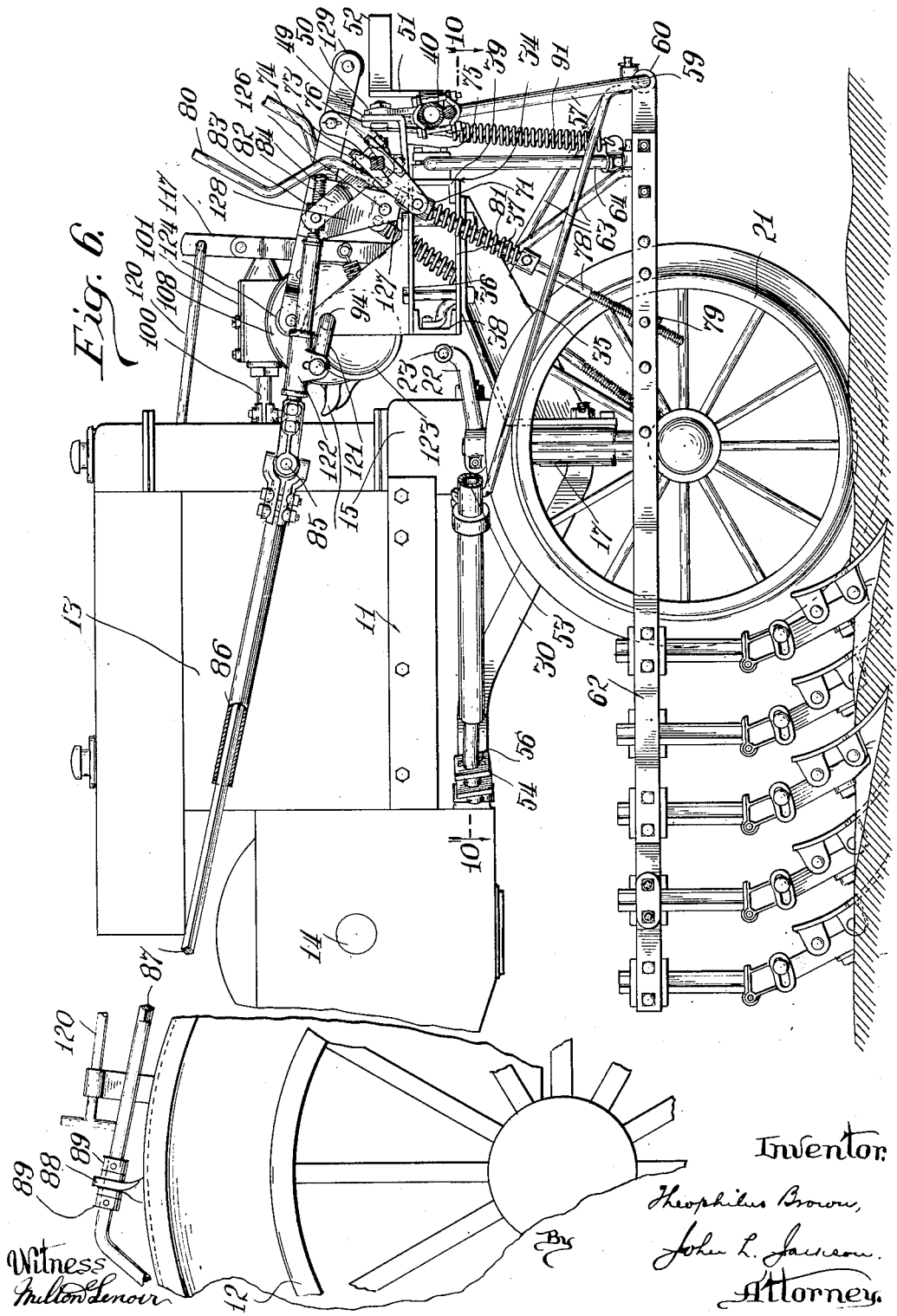
Fig. 6 is a view showing some of the parts of the cultivator in side elevation.

By this arrangement the outer end of each frame extension is provided with a ground support that is free to conform to changes in the direction of travel of the machine. The inner portion of the frame extension 40 is pivotally supported upon the adjacent end of the intermediate member of the cultivator frame by a pivot 48 carried by a bracket 49 secured to and rising from said intermediate frame member, as shown in Fig. 1, the frame extension 40 being mounted on said pivot by means of a standard 50 that is rigid therewith and extends upward therefrom at a point between its ends but considerably closer to its inner than to its outer end. By this construction that part of the frame extension 40 that projects inward from the standard 50 constitutes an inwardly extending arm or lever 51, the purpose of which will be hereinafter explained. As shown in Figs. 2 and 6, this inwardly extending portion is bent upward and near its end is bent forward at a right angle to form a crank 52, the cranks of the two frame extensions at opposite sides of the median line of the machine being parallel with each other, as shown in Fig. 1. Manifestly by pressing downward on the cranks 52 the two cultivator frame extensions may be swung upward about the pivots 48, as indicated by dotted lines in Fig. 5, thereby raising the caster wheels 45 clear of the ground, the cultivator frame then being supported entirely on the front wheels 21. The outer end portion of each frame extension is braced from the V-shaped yoke 30 that is connected with the front axle, by means of a thrust bar 53, the outer end portion of which is fixedly secured to the sleeve 41, while its rear end is pivotally mounted in a yoke 54 having a swivel connection with the adjacent arm of the yoke 30 by means of a pivot 55, as best shown in Fig. 10. Pins 56 extend through the rear end of the thrust bar 53 at opposite sides of the yoke 54 to hold it against endwise movement therein. With this arrangement vertical swinging of the frame extensions relatively to the front axle is permitted, and the thrust bars 53 do not interfere with the rocking of the front axle about a longitudinal axis. The thrust bars 53 support the outer ends of the frame extensions against the drag of the cultivator rigs, and, as shown in Fig. 6. they are placed high enough so that they do not interfere with the raising of the rigs out of operative position independently of vertical swinging movement of the frame extensions.

Secured to the frame extensions or draft members are arches 57 of the type commonly employed on straddle-row cultivators for connecting the front ends of the rigs with the cultivator frame. These arches are fixedly secured to their respective supports in any suitable way, as by clamps 58. As shown in Fig. 2, one of said arches is secured to the intermediate portion of each frame extension 40. These arches are provided at their lower ends with horizontally extending journals 59 on which are mounted sleeves 60 carried at the front ends of cultivator beams 61, 62 of any suitable description. These beams are arranged to swing vertically about the transverse axes provided by the horizontal portions 59 of the arches 57 to adjust the depth of cultivation, and also to raise the shovels clear of the ground. The means by which this vertical adjustment of the rigs is accomplished will be hereinafter explained.

As best shown in Figs. 6 and 10, the end portions of the arches 57 are braced by brace rods 63 that are connected at their front ends with the horizontal portions of said arches, and at their rear ends with the thrust bars 53. By this means the arches 57 are secured in fixed relation to the frame extensions to which they are respectively connected.

An arch 64 of the same kind as the arches 57 is in like manner secured to the central portion of the stationary frame member, as best shown in Fig. 2, and forms a similar support for the central rigs of the machine. The horizontal portions 65 of the arch 64 are braced by braces 66 connected with the intermediate frame member 34, preferably through the rear channel bar 38 thereof, as best shown in Fig. 7.

As has been stated, the several cultivator rigs may be raised or lowered independently of each other by manually operable means; they may be raised or lowered in unison, also by manually operable means, and they may be raised or lowered in unison by power operated means. The manual adjustments referred to are designed primarily for setting the rigs to operate at a greater or less depth, but if desired they may be used to raise the shovels clear of the ground. In addition to these movements the rigs connected with the frame extensions may be swung upward about their longitudinal axes, this also being accomplished by power operated means. The construction by which these several adjustments are made will now be described.

By reference to Fig. 1, it will be seen that a transversely disposed rock shaft 67 is mounted on the forward portion of the intermediate frame member 34. Said shaft is noncircular in cross-section, preferably square, and is rotatably supported upon said frame member by mounting it in bushings 68 journaled in suitable bearings in standards 69 secured to the channel bar 39 of the frame member 34, as best shown in Fig. 3. Preferably the bushings 68 are provided with a marginal flange 70 at one end thereof, and with a rib 71 at the opposite margin, which is adapted to be brought into registration with a groove 72 in the peripheral portion of the bearing. As best shown in Figs. 3 and 4, the arrangement is such that by turning the bushing so that the rib 71 registers with the groove 72, the bushing may be inserted or removed, and, after insertion, by turning the bushing so that said rib is out of line with the groove the bushing is held against withdrawal. In assembling the parts the bushing is so adjusted that the rib 71 is normally approximately 180 degrees from the groove 72, and as said bushing rocks only through an arc of about 90 degrees from its normal position, it never turns far enough during the operation of the machine to bring its rib into alinement with said groove, and, therefore, is always held in operative relation to its standard. Two or more of the standards 69 are provided for the rock shaft 67, spaced far enough apart to support the same, as best shown in Figs. 1 and 2. The end portions of said rock shaft are provided with extensions 73 of similar character, which are connected thereto by universal joints 74, as shown in said figure. The extension rock shafts 73 are mounted in bearings carried by standards 75, similar to the arrangement shown in Figs. 3 and 4, the standards 75 being secured to and rising from the frame extensions 40 so that they swing therewith. As shown in Fig. 2, the universal joints 74 are axially alined with the pivots 48 by which the frame extensions 40 are connected with the intermediate frame member, so that vertical swinging movement of the extension frames and rock shafts is not interfered with, and the rock shaft extensions 63 may be rocked by rocking the rock shaft 67 regardless of any such vertical swinging movement.

The rock shaft 67 and its extensions 73 are provided with rigid arms 76 above each of the cultivator rigs, which arms carry pivoted collars 77 through which extend shafts 78, the lower end portions of which are screw-threaded and work in screw-threaded sleeves 79 pivotally connected with the cultivator rigs, as best shown in Fig. 7. The upper ends of said shafts are provided with cranks 80. Thus by rotating the shafts 78 through the cranks 80 the cultivator rigs may be adjusted vertically to vary the depth of cultivation. Said cranks are independent of each other, and, therefore, the adjustment of any one rig does not affect the position of the others. Springs 81 are mounted on the several shafts to exert yielding downward pressure on the cultivator rigs and to permit the several rigs to swing upward in case the shovels thereof encounter unusual obstacles. In adjusting the rigs by rotation of the cranks 80, the rock shaft 67 and its extensions are not rocked, as such adjustment is effected by moving the sleeves 79 along the shafts 78. Said shafts, however, serve also as operative connections between the arms 76 of the rock shaft and its extensions, and the cultivator rigs, so that when said rock shaft is rocked the several rigs are raised or lowered in unison. The rocking of said rock shaft for this purpose may be effected either manually or by power. For rocking it manually I provide the intermediate portion 67 of the rock shaft with an upwardly extending arm 82 on which is pivotally mounted an internally screw-threaded collar 83. Working in such collar is a screw-threaded shaft 84 that extends fore and aft, its rear end being connected by a universal joint 85 with the forward member 86 of an extensible shaft, the rear member 87 of which is square and telescopes with the member 86. The rear end of the member 87 extends through and is loosely mounted in a bracket 88 mounted on the rear portion of the tractor frame, as shown in Fig. 6. Collars 89 at opposite sides of the bracket 88 prevent endwise movement of the shaft member 87, and at the rear end of said shaft member is a crank 90 by which it may be rotated, said crank being located so that it is conveniently accessible to the operator. Obviously, by rotating the crank 90 the arm 82 may be swung forward or backward, thereby rocking the rock shaft 67, with its extensions 73, to raise or lower the rigs in unison. The provision of the universal joint 85 allows for the angular movement of the shaft 84 with respect to the shaft members 86, 87 necessary to accommodate the rocking of the cultivator frame about a longitudinal axis, and the shaft comprising the members 86, 87 is made extensible to permit the independent operation of the power lift mechanism hereinafter described.

The mechanism thus far described for separately adjusting the several rigs, and for manually raising or lowering them in unison, is substantially the same as that shown and described in my pending application, and, therefore, is not separately claimed herein.

To balance the cultivator rigs, and also to aid in lifting them, I preferably provide springs 91 associated with the arch 64 and connected therewith at their lower ends, as best shown in Fig. 2, the upper ends of said springs being connected by adjustable links 92 with forwardly projecting arms 93 secured to the rock shaft 67.

In my present construction I provide power operated mechanism for raising and lowering the cultivator rigs in unison, that is similar in construction and operation to that shown and described in my said pending application so far as the swinging of the rigs vertically about a transverse axis is concerned, but it operates also to swing the cultivator rigs vertically about longitudinal axes, except the rigs that are connected with the arch 64. As the latter rigs are located adjacent to the center of the machine and rock about a longitudinal axis with the intermediate frame 34 there is no need of providing means for swinging them in that manner. Such power operated mechanism comprises a rotatable shaft 94 that is mounted on the intermediate frame member 34 and extends transversely of the machine, said shaft being supported by suitable standards 95 rising from said frame member, as shown in Fig. 8. Upon one end of said shaft is loosely mounted a clutch member 96 having an axially disposed sleeve 97 which carries a worm wheel 98 keyed thereto, as shown in Fig. 8. A worm 99, which is mounted on a shaft 100 that extends fore and aft at one side of the tractor frame, meshes with said worm wheel and by its rotation rotates the same and also the clutch member 96. A housing 101 encloses said worm and worm wheel, said housing being preferably integral with a standard 102 which forms a support for that end of the shaft 94 and the parts mounted thereon. Said housing also provides a bearing for the shaft 100. The rear end of the latter shaft is connected by a universal joint 103 with an intermediate shaft 104 which at its rear end is connected by a universal joint 105 with a power transmitting or take-off shaft 106 that extends back to a point adjacent to the rear end of the motor by which it is driven. Preferably I provide for driving the power take-off shaft 106 from the motor through sprocket wheel and chain mechanism enclosed in a housing 107 shown in Fig. 1, but any other suitable means for that purpose may be employed. Such driving mechanism is arranged to rotate the power take-off shaft 106 whenever the motor is in operation, and consequently the worm wheel 98 and clutch member 96 are continuously rotated. Said clutch member is adapted to cooperate with a clutch member 108 that is non-rotatably secured to the shaft 94, as shown in Fig. 8, the means for connecting such clutch members being preferably such as that commonly employed on many power lift plows and other agricultural implements, of the type known as the half revolution clutch. That is to say, the clutch mechanism has associated therewith certain tripping devices which operate normally to hold the clutch members out of operative connection with each other, but when tripped will cause them to become connected and to remain connected until the clutch has made a half rotation, when they are automatically disconnected by such trip mechanism. On the next actuation of the trip mechanism the clutch members are again connected and remain so until they complete the second half of the cycle, when they are again disconnected. As such clutches are well-known to those familiar with the art it is unnecessary to describe the construction in detail, and it will suffice to say that the clutch member 96 is provided on its inner circumference with a series of notches 109 adapted to be engaged by a roller 110 under the action of a spring 111, said roller being carried by the clutch member 108. The spring 111 acts through levers 112, 113 and a link 114 to move the roller 110 into engagement with said notches. The levers 112, 113 are provided with outwardly extending arms 112$^a$, 113$^a$, respectively, which project beyond the periphery of the clutch member 108 and are adapted to be engaged by a roller 116 carried by a trip lever 117 pivotally mounted at 118 on the intermediate frame member 34, as best shown in Fig. 9. A spring 119 normally tends to hold the roller 116 against the periphery of the clutch member 108 so that it is adapted to intercept one or the other of the arms 112$^a$, 113$^a$ to rock the levers with which said arms are connected so as to disconnect the clutch members. The trip lever 117 is provided with a rod 120 that extends back to the driver's seat so that he can actuate said lever to effect the connection of the clutch members. It will be understood from the foregoing description that whenever the clutch members are connected the shaft 94 will rotate with the worm 98 through half a rotation of the clutch members and will then stop, and that when the trip lever is again actuated said shaft will rotate through the second half of its cycle and again stop.

The rotation of the shaft 94 raises or lowers the cultivator rigs in unison through the instrumentality of a crank 121 carried by said shaft at the end opposite that on which the worm is mounted, as shown in Figs. 1 and 6. Said crank is connected with a sleeve 122 mounted on the longitudinally extending shaft 84, as shown in the latter figure, and suitably held against endwise movement thereon. Consequently, when the shaft 94 rotates the shaft 84 is moved endwise. During the upward and forward movement of the crank 121 the shaft 84 is moved forward to rock the shaft 67 and lift the cultivator rigs, whereas during the downward and backward swinging of said crank the shaft 84 is moved rearwardly, thereby rocking the rock shaft 67 in the opposite direction and lowering the rigs. The rocking of the rock shaft 67 in either direction similarly rocks the extensions of said rock shaft, so that all the rigs are raised or lowered in unison. Such rocking does not, of course, affect the previously set relation of the several rigs to each other that may have been accomplished by the operation of the devices for adjusting them individually. Also, it will be understood that the backward and forward movement of the shaft 84 effected by the rotation of the shaft 94 does not affect the connections between the manually operable crank 90 at the rear of the tractor and the rock shaft 67.

When the rock shaft 67 is rocked to raise or lower the cultivator rigs in unison the frame extensions, and also the rock shaft extensions, are swung upward or downward correspondingly by power operated means comprising an eccentric 123 mounted upon and keyed to the shaft 94 substantially in the median line of the machine, as best shown in Figs. 1, 7 and 8. Said eccentric underlies a roller 124 mounted upon the rear end portion of a walking beam 125 fulcrumed on a pivot 126 which is supported by a bracket 127 mounted on said frame, the walking beam being provided with a downwardly extending arm 128 which supports it on said pivot. The forward end of the walking beam is provided with a roller 129 which is adapted to ride on the forwardly extending arms 52 of the inwardly extending end portions of the frame extensions, as best shown in Fig. 2. The operation will be readily understood from the foregoing description. When the shaft 94 rotates, the eccentric 123 also rotates and engages the rear end of the walking beam 125, causing it to rock so that its forward end moves downward into engagement with the arms 52. As the downward movement of the front end of the walking beam continues the arms 52 are depressed, thereby rocking the frame extensions 40 about the pivots 48, which swings the outer ends of said frame extensions upward in the manner illustrated in dotted lines in Fig. 5. This, of course, lifts the rigs connected with said frame extensions. When the shaft 94 completes the first half of a cycle it stops, and so also does the eccentric, which holds the frame extensions in their elevated position, which position they will maintain until the shaft 94 starts to rotate through the second half of its cycle, when they will be lowered to their former position. These movements are controlled by the operator through the actuation of the trip lever 117, as has been explained. While the two cultivator rigs at the center of the machine are not swung upward about a longitudinal axis during the operation above described, they are swung upward about a transverse axis simultaneously with the upward swinging of the outer rigs about longitudinal and transverse axes, and they are lowered again when the outer rigs are lowered.

It is to be noted that the walking beam and associated structure, cooperating with the inner ends 51 of the lateral frame extensions 40, serve to support or limit the downward movement of the latter relative to the tractor in much the same manner as the caster wheels 45 support or limit the downward movement of the members 40 relative to the ground. Normally, of course, the wheels 45 support the outer ends of the members 40 but nevertheless if either or both of these wheels should drop into a hole or traverse a low place either or both of the ends 52 would engage the roller 129 so that further downward movement would be prevented. Thus, both the wheels 45 and the walking beam structure act as a stop to support, or limit the downward movement of, the lateral members 40, but they do not in any way limit or interfere with the independent upward movement of members 40, as for example if the tractor were in a low place with either or both sets of rigs operating on higher ground. In case it is desired to cultivate two rows only the draft member at either side may be removed by disconnecting the thrust bar from the yoke 30 and the transverse bar 40 from the intermediate frame section, the rock shaft extensions being removable by disconnecting the universal joint.

I wish it to be understood that my invention is not limited to the specific embodiment thereof illustrated and described, but is generic in character and includes such alterations or modifications as may occur to those skilled in the art. So far as I am aware, no one has heretofore proposed to provide a cultivator or analogous implement of the present type with laterally disposed rigs supported so as to be capable of swinging vertically about longitudinal axes, or about both longitudinal and transverse axes; or one having power operated means for so swinging the rigs. In addition to these generic features of improvement, my invention also includes broadly the application thereof to a power propelled cultivator or like implement by means of a cultivator frame capable of rocking about a longitudinal axis; also the combination of such vertically swinging movements of the cultivator supporting elements with means for swinging the cultivator rigs vertically about a transverse axis by power, or by manually operable or power operable devices that can be employed either separately or conjointly.

What I claim as my invention and desire to secure by Letters Patent, is—

1. In an agricultural implement, the combination with a tractor, of an attachment comprising a member extending laterally from the tractor and connected to swing vertically about a longitudinal axis, ground engaging means supporting said member, and connected to swing therewith, a rig connected with said member to swing vertically about a transverse axis, and lifting means on said member connected with said rig and operable to lift the same, said lifting means being adapted to be actuated by means on the tractor.

2. In an agricultural implement, the combination with a tractor including a motor, of an attachment comprising a member extending laterally from the tractor and connected to swing vertically about a longitudinal axis, ground engaging means supporting said member, and connected to swing therewith, a rig connected with said member to swing vertically about a transverse axis, and power lift mechanism adapted to be actuated by said motor to swing said member vertically.

3. In an agricultural implement, the combination with a tractor including a motor, of an attachment comprising a member extending laterally from the tractor and connected to swing vertically about a longitudinal axis, ground engaging means supporting said member, and connected to swing therewith, a rig connected with said member to swing vertically about a transverse axis, lifting means on said member connected with said rig and operable to lift the same, and power lift mechanism adapted to be actuated by said motor to operate said lifting means.

4. In an agricultural implement, the combination with a tractor including a motor, of an attachment comprising a member extending laterally from the tractor and connected to swing vertically about a longitudinal axis, ground engaging means supporting said member, and connected to swing therewith, a rig connected with said member to swing vertically about a transverse axis, lifting means on said member connected with said rig and adapted to be operated manually by means on the tractor to lift said rig, and power lift mechanism adapted to be actuated by said motor to operate said lifting means.

5. In an agricultural implement, the combination with a tractor, of an attachment comprising a frame connected therewith to rock about a longitudinal axis, a member projecting laterally from, and connected with, said frame to swing vertically about an axis extending longitudinally of the implement, a soil tilling rig connected with said member to swing vertically about a transverse axis, and lifting means connected with said rig and operable to lift the same, said lifting means being adapted to be actuated by means on the tractor.

6. In an agricultural implement, the combination with a tractor including a motor, of an attachment comprising a frame connected with the tractor to rock about a longitudinal axis, a member projecting laterally from, and connected with, said frame to swing vertically about an axis extending longitudinally of the implement, a soil tilling rig connected with said member to swing vertically about a transverse axis, and power lift mechanism adapted to be actuated by said motor comprising lifting means connected with said rig and operable to lift the same.

7. In an agricultural implement, the combination with a tractor including a motor, of an attachment comprising a frame connected with the tractor to rock about a longitudinal axis, a member projecting laterally from, and connected with, said frame to swing vertically about an axis extending longitudinally of the implement, ground engaging means supporting said member and connected to swing therewith, a soil tilling rig connected with said member to swing vertically about a transverse axis, and power lift mechanism adapted to be actuated by said motor comprising lifting means on said member operable to lift said rig.

8. In an agricultural implement, the combination with a tractor including a front truck adapted to rock about a longitudinal axis, of an attachment comprising a frame connected with said truck to rock therewith, a member projecting laterally from, and connected with, said frame to swing vertically about an axis extending longitudinally of the implement, a soil tilling rig connected with said member to swing vertically about a transverse axis, and lifting means on said frame operable to lift said rig and adapted to be operated by actuating means on the tractor.

9. In an agricultural implement, the combination with a tractor including a motor and a front truck adapted to rock about a longitudinal axis, of an attachment comprising a frame connected with said truck to rock therewith, a member projecting laterally from, and connected with, said frame to swing vertically about an axis extending longitudinally of the implement, a soil tilling rig connected with said member to swing vertically about a transverse axis, lifting means on said member operable to lift said rig, and power lift mechanism adapted to be actuated by said motor comprising actuating mechanism on said frame operatively connected with said lifting means.

10. In an agricultural implement, the combination with a tractor including a motor, of an attachment comprising a frame connected with the tractor to rock about a longitudinal axis, a member projecting laterally from, and connected with, said frame to swing vertically about an axis extending longitudinally of the implement, a soil tilling rig connected with said member to swing vertically about a transverse axis, lifting means on said member operable to lift said rig, and power lift mechanism adapted to be actuated by said motor comprising half revolution clutch mechanism on said frame operatively connected with said lifting means.

11. In an agricultural implement, the combination with a tractor including a motor and a front truck adapted to rock about a longitudinal axis, of an attachment comprising a frame connected with said truck to rock therewith, a member projecting laterally from, and connected with, said frame to swing vertically about an axis extending longitudinally of the implement, a soil tilling rig connected with said member to swing vertically about a transverse axis, lifting means on said member operable to lift said rig, and power lift mechanism adapted to be actuated by said motor comprising half revolution clutch mechanism on said frame operatively connected with said lifting means.

12. In an agricultural implement, the combination with a tractor including a motor, of an attachment comprising a frame connected with the tractor to rock about a longitudinal axis, a member projecting laterally from, and connected with, said frame to swing vertically about an axis extending longitudinally of the implement, a soil tilling rig connected with said member to swing vertically about a transverse axis, lifting means on said member adapted to be operated manually by means on the tractor to lift said rig, and power lift mechanism adapted to be actuated by said motor comprising half revolution clutch mechanism on said frame operatively connected with said lifting means.

13. In an agricultural implement, the combination with a tractor including a motor and a front truck adapted to rock about a longitudinal axis, of an attachment comprising a frame connected with said truck to rock therewith, a member projecting laterally from, and connected with, said frame to swing vertically about an axis extending longitudinally of the implement, a soil tilling rig connected with said member to swing vertically about a transverse axis, lifting means on said member adapted to be operated manually by means on the tractor to lift said rig, and power lift mechanism adapted to be actuated by said motor comprising half revolution clutch mechanism on said frame operatively connected with said lifting means.

14. In an agricultural implement, the combination with a tractor, of an attachment comprising a frame connected in front of the tractor to rock about a longitudinal axis, members projecting laterally from and connected with the end portions of said frame to swing vertically about axes extending longitudinally of the implement, soil tilling rigs connected with said members to swing vertically about transverse axes, lifting means on said members operable to lift said rigs, and means on said frame connecting said lifting means to operate in unison, said lifting means being adapted to be operated by actuating means on the tractor.

15. In an agricultural implement, the combination with a tractor including a motor, of an attachment comprising a frame connected in front of the tractor to rock about a longitudinal axis, members projecting laterally from and connected with the end portions of said frame to swing vertically about axes extending longitudinally of the implement, soil tilling rigs connected with said members to swing vertically about transverse axes, lifting means on said members operable to lift said rigs, and power lift mechanism adapted to be actuated by said motor comprising means on said frame operatively connected with the lifting means on said members to operate the same in unison.

16. In an agricultural implement, the combination with a tractor including a motor, of an attachment comprising a frame connected in front of the tractor to rock about a longitudinal axis, members projecting laterally from and connected with the end portions of said frame to swing vertically about axes extending longitudinally of the implement, soil tilling rigs connected with said members to swing vertically about transverse axes, lifting means on said members operable to lift said rigs, and power lift mechanism adapted to be actuated by said motor comprising half revolution clutch mechanism on said frame operatively connected with the lifting means on said members to operate the same in unison.

17. In an agricultural implement, the combination with a tractor, including a front truck adapted to rock about a longitudinal axis, of an attachment comprising a frame connected with said truck to rock therewith, members projecting laterally from, and connected with, the end portions of said frame to swing vertically about axes extending longitudinally of the implement, soil tilling rigs connected with said members to swing vertically about transverse axes, lifting means on said members operable to lift said rigs, and means on said frame connecting said lifting means to operate in unison, said lifting means being adapted to be operated by actuating means on the tractor.

18. In an agricultural implement, the combination with a tractor including a motor and a front truck adapted to rock about a longitudinal axis, of an attachment comprising a frame connected with said truck to rock therewith, members projecting laterally from, and connected with, the end portions of said frame to swing vertically about axes extending longitudinally of the implement, soil tilling rigs connected with said members to swing vertically about transverse axes, lifting means on said members operable to lift said rigs, and power lift mechanism adapted to be actuated by said motor comprising means on said frame operatively connected with the lifting means on said members to operate the same in unison.

19. In an agricultural implement, the combination with a tractor including a motor and a front truck adapted to rock about a longitudinal axis, of an attachment comprising a frame connected with said truck to rock therewith, members projecting laterally from and connected with the end portions of said frame to swing vertically about axes extending longitudinally of the implement, soil tilling rigs connected with said members to swing vertically about transverse axes, lifting means on said members operable to lift said rigs, and power lift mechanism adapted to be actuated by said motor comprising half revolution clutch mechanism on said frame operatively connected with the lifting means on said members to operate the same in unison.

20. In an agricultural implement, the combination with a tractor, of an attachment comprising a frame connected in front of the tractor to rock about a longitudinal axis, members projecting laterally from and connected with the end portions of said frame to swing vertically about axes extending longitudinally of the implement, ground engaging means supporting said members, and connected to swing therewith, soil tilling rigs connected with said members to swing vertically about transverse axes, lifting means on said members operable to lift said rigs, and means on said frame connecting said lifting means to operate in unison, said lifting means being adapted to be operated by actuating means on the tractor.

21. In an agricultural implement, the combination with a tractor including a motor, of an attachment comprising a frame connected in front of the tractor to rock about a longitudinal axis, members projecting laterally from and connected with the end portions of said frame to swing vertically about axes extending longitudinally of the implement, ground engaging means supporting said members, and connected to swing therewith, soil tilling rigs connected with said members to swing vertically about transverse axes, lifting means on said members operable to lift said rigs, and power lift mechanism adapted to be actuated by said motor comprising means on said frame operatively connected with the lifting means on said members to operate the same in unison.

22. In an agricultural implement, the combination with a tractor including a motor, of an attachment comprising a frame connected in front of the tractor to rock about a longitudinal axis, members projecting laterally from and connected with the end portions of said frame to swing vertically about axes extending longitudinally of the implement, ground engaging means supporting said members, and connected to swing therewith, soil tilling rigs connected with said members to swing vertically about transverse axes, lifting means on said members operable to lift said rigs, and power lift mechanism adapted to be actuated by said motor comprising half revolution clutch mechanism on said frame operatively connected with the lifting means on said members to operate the same in unison.

23. In an agricultural implement, the combination with a tractor, of an attachment comprising a frame connected in front of the tractor to rock about a longitudinal axis, members projecting laterally from and connected with the end portions of said frame to swing vertically about axes extending longitudinally of the implement, soil tilling rigs connected respectively with said frame and with said members to swing vertically, lifting means on said frame and on said members operable to lift said rigs, and means connecting said lifting means together to operate in unison, said lifting means being adapted to be operated by actuating means on the tractor.

24. In an agricultural implement, the combination with a tractor including a motor, of an attachment comprising a frame connected in front of the tractor to rock about a longitudinal axis, members projecting laterally from and connected with the end portions of said frame to swing vertically about axes extending longitudinally of the implement, soil tilling rigs connected respectively with said frame and with said members to swing vertically, lifting means on said frame and on said members operable to lift said rigs, and power lift mechanism adapted to be actuated by said motor, comprising half revolution clutch mechanism on said frame operatively connected with said lifting means to operate the same in unison.

25. In an agricultural implement, the combination with a tractor including a motor, of an attachment comprising a frame connected with the tractor, a member projecting laterally from, and connected with, said frame to swing vertically about an axis extending longitudinally of the implement, a soil tilling rig connected with said member to swing vertically, and means adapted to be actuated by the motor to swing said member vertically.

26. In an agricultural implement, the combination with a tractor including a motor, of an attachment comprising a frame connected with the tractor, a member projecting laterally from, and connected with, said frame to swing vertically about an axis extending longitudinally of the implement, a soil tilling rig connected with said member to swing vertically, and power lift mechanism adapted to be actuated by said motor comprising means on said frame operable to swing said member vertically.

27. In an agricultural implement, the combination with a tractor including a motor, of an attachment comprising a frame connected with the tractor to rock about a longitudinal axis, a member projecting laterally from, and connected with, said frame to swing vertically about an axis extending longitudinally of the implement, a soil tilling rig connected with said member to swing vertically about a transverse axis, and means adapted to be actuated by the motor to swing said member vertically.

28. In an agricultural implement, the combination with a tractor including a motor, of an attachment comprising a frame connected with the tractor to rock about a longitudinal axis, a member projecting laterally from, and connected with, said frame to swing vertically about an axis extending longitudinally of the implement, ground engaging means supporting said member, and connected to swing therewith, a soil tilling rig connected with said member to swing vertically about a transverse axis, and means adapted to be actuated by the motor to swing said member vertically.

29. In an agricultural implement, the combination with a tractor including a motor, of an attachment comprising a frame connected with the tractor to rock about a longitudinal axis, a member projecting laterally from, and connected with, said frame to swing vertically about an axis extending longitudinally of the implement, ground engaging means supporting said member, and connected to swing therewith, a soil tilling rig connected with said member to swing vertically about a transverse axis, and power lift mechanism adapted to be actuated by said motor comprising means on said frame operable to swing said member vertically.

30. In an agricultural implement, the combination with a tractor including a motor, of an attachment comprising a frame connected in front of the tractor, members projecting laterally from and connected with the end portions of said frame to swing vertically about axes extending longitudinally of the implement, soil tilling rigs connected with said members respectively to swing vertically about transverse axes, and means adapted to be actuated by the motor to swing said members vertically in unison.

31. In an agricultural implement, the combination with a tractor including a motor, of an attachment comprising a frame connected in front of the tractor, members projecting laterally from and connected with the end portions of said frame to swing vertically about axes extending longitudinally of the implement, soil tilling rigs connected with said members respectively to swing vertically about transverse axes, and power lift mechanism adapted to be actuated by said motor comprising means on said frame operable to swing said members vertically.

32. In an agricultural implement, the combination with a tractor including a motor, of an attachment comprising a frame connected in front of the tractor, members projecting laterally from and connected with the end portions of said frame to swing vertically about axes extending longitudinally of the implement, soil tilling rigs connected respectively with said members to swing vertically about transverse axes, lifting means on said members operable to lift said rigs, means adapted to be actuated by the motor to swing said members vertically, and means adapted to be actuated by the motor to operate said lifting means.

33. In an agricultural implement, the combination with a tractor including a motor, of an attachment comprising a frame connected in front of the tractor, members projecting laterally from and connected with the end portions of said frame to swing vertically about axes extending longitudinally of the implement, soil tilling rigs connected respectively with said members to swing vertically about transverse axes, lifting means on said members operable to lift said rigs, means adapted to be actuated by the motor to swing said members vertically, and means adapted to be actuated by the motor to operate said lifting means, said lifting means being adapted to be operated manually by means on the tractor.

34. In an agricultural implement, the combination with a tractor including a motor, of an attachment comprising a frame connected in front of the tractor, members projecting laterally from and connected with the end portions of said frame to swing vertically about axes extending longitudinally of the implement, soil tilling rigs connected respectively with said members to swing vertically about transverse axes, lifting means on said members operable to lift said rigs, and power lift mechanism adapted to be actuated by said motor comprising means on said frame operable to swing said members vertically and to operate said lifting means.

35. In an agricultural implement, the combination with a tractor including a motor, of an attachment comprising a frame connected in front of the tractor, members projecting laterally from and connected with the end portions of said frame to swing vertically about axes extending longitudinally of the implement, soil tilling rigs connected respectively with said members to swing vertically about transverse axes, lifting means on said members operable to lift said rigs, and power lift mechanism adapted to be actuated by said motor comprising means on said frame operable to swing said members vertically and to operate said lifting means, said lifting means adapted to be operated manually by means on the tractor.

36. In an agricultural implement, the combination with a tractor including a motor, of an attachment comprising a frame connected in front of the tractor to rock about a longitudinal axis, members projecting laterally from and connected with the end portions of said frame to swing vertically about axes extending longitudinally of the implement, soil tilling rigs connected respectively with said members to swing vertically, lifting means on said members operable to lift said rigs, and power lift mechanism adapted to be actuated by said motor comprising half revolution clutch mechanism on said frame operable to swing said members vertically and to operate said lifting means.

37. In an agricultural implement, the combination with a tractor including a motor, of an attachment comprising a frame connected in front of the tractor to rock about a longitudinal axis, members projecting laterally from and connected with the end portions of said frame to swing vertically about axes extending longitudinally of the implement, soil tilling rigs connected respectively with said members to swing vertically, lifting means on said members operable to lift said rigs, and power lift mechanism adapted to be actuated by said motor comprising half revolution clutch mechanism on said frame operable to swing said members vertically and to operate said lifting means, said lifting means adapted to be operated manually by means on the tractor.

38. In an agricultural implement, the combination with a tractor including a motor and a front truck adapted to rock about a longitudinal axis, of an attachment comprising a frame connected with said truck to rock therewith, members projecting laterally from and connected with the end portions of said frame to swing vertically about axes extending longitudinally of the implement, soil tilling rigs connected respectively with said members to swing vertically, lifting means on said members operable to lift said rigs, and power lift mechanism adapted to be actuated by said motor comprising half revolution clutch mechanism on said frame operable to swing said members vertically and to operate said lifting means.

39. In an agricultural implement, the combination with a tractor including a motor and a front truck adapted to rock about a longitudinal axis, of an attachment comprising a frame connected with said truck to rock therewith, members projecting laterally from and connected with the end portions of said frame to swing vertically about axes extending longitudinally of the implement, soil tilling rigs connected respectively with said members to swing vertically, lifting means on said members operable to lift said rigs, and power lift mechanism adapted to be actuated by said motor comprising half revolution clutch mechanism on said frame operable to swing said members vertically and to operate said lifting means, said lifting means adapted to be operated manually by means on the tractor.

40. In an agricultural implement, the combination with a tractor, of an attachment comprising a member extending laterally from the tractor and connected to swing vertically about a longitudinal axis, ground engaging means supporting said member and connected to swing therewith, a rig connected with said member to swing vertically, lifting means on said member connected with said rig and operable to lift the same, and half revolution clutch mechanism for actuating said lifting means.

41. In an agricultural implement, the combination with a tractor, of an attachment comprising a frame connected therewith to rock about a longitudinal axis, a member projecting laterally from, and connected with, said frame to swing vertically about an axis extending longitudinally of the implement, a soil tilling rig connected with said member to swing vertically, lifting means on said member connected with said rig and operable to lift the same, and half revolution clutch mechanism for actuating said lifting means.

42. In an agricultural implement, the combination with a tractor including a front truck adapted to rock about a longitudinal axis, of an attachment comprising a frame connected with said truck to rock therewith, a member projecting laterally from, and connected with, said frame to swing vertically about an axis extending longitudinally of the implement, a soil tilling rig connected with said member to swing vertically, lifting means operable to lift said rig, and half revolution clutch mechanism on said frame for actuating said lifting means.

43. In an agricultural implement, the combination with a tractor, of an attachment comprising a frame connected in front of the tractor to rock about a longitudinal axis, members projecting laterally from, and connected with, the end portions of said frame to swing vertically about axes extending longitudinally of the implement, soil tilling rigs connected with said members to swing vertically, lifting means on said members operable to lift said rigs, and power lift mechanism comprising half revolution clutch mechanism on said frame operatively connected with the lifting means on said members for operating the same in unison.

44. In an agricultural implement, the combination with a tractor, of an attachment comprising a frame connected in front of the tractor to rock about a longitudinal axis, members projecting laterally from, and connected with, the end portions of said frame to swing vertically about axes extending longitudinally of the implement, soil tilling rigs connected with said members to swing vertically, half revolution clutch mechanism on said frame adapted to be actuated by means on the tractor, a walking beam actuated by said clutch mechanism, and means operated by said walking beam for swinging said members.

45. In an agricultural implement, the combination with a tractor, of an attachment comprising a frame connected in front of the tractor to rock about a longitudinal axis, members projecting laterally from, and connected with, the end portions of said frame to swing vertically about axes extending longitudinally of the implement, soil tilling rigs connected with said members to swing vertically, half revolution clutch mechanism on said frame adapted to be actuated by means on the tractor, a walking beam, an eccentric driven by said clutch mechanism for actuating said walking beam, and means operated by said walking beam for swinging said members.

46. In an agricultural implement, the combination with a tractor, of an attachment comprising a frame connected in front of the tractor to rock about a longitudinal axis, members projecting laterally from, and connected with, the end portions of said frame to swing vertically about axes extending longitudinally of the implement, soil tilling rigs connected with said members to swing vertically, half revolution clutch mechanism on said frame adapted to be actuated by means on the tractor, a walking beam actuated by said clutch mechanism, means operated by said walking beam for swinging said members, lifting means on said members operable to lift said rigs, and means operable by said clutch mechanism for actuating said lifting means.

47. In an agricultural implement, the combination with a tractor, of an attachment comprising a frame connected in front of the tractor to rock about a longitudinal axis, members projecting laterally from, and connected with, the end portions of said frame to swing vertically about axes extending longitudinally of the implement, soil tilling rigs connected with said members to swing vertically, half revolution clutch mechanism on said frame adapted to be actuated by means on the tractor, a walking beam, an eccentric driven by said clutch mechanism for actuating said walking beam, means operated by said walking beam for swinging said members, lifting means on said members, and means operable by said clutch mechanism for actuating said lifting means.

48. In an agricultural implement, the combination with a tractor, of an attachment comprising a frame connected in front of the tractor to rock about a longitudinal axis, members projecting laterally from and connected with the end portions of said frame to swing vertically about axes extending longitudinally of the implement, caster wheels supporting the outer end portions of said members, rigs connected with said members to swing vertically, lifting means on said members operable to lift said rigs, and actuating means on the tractor adapted to be operated to actuate said lifting means.

49. In an agricultural implement, the combination with a tractor including a motor, of an attachment comprising a frame connected therewith to swing vertically about a longitudinal axis, a member projecting laterally from and connected with an end portion of said frame to swing vertically about an axis extending longitudinally of the implement, a soil tilling rig connected with said member to swing vertically, lifting devices for said rig comprising a jointed rock-shaft mounted on said frame and said member, and means connecting said rock-shaft with said rig to move the same vertically by the rocking of said rock-shaft, and means adapted to be actuated by said motor to rock said rock-shaft.

50. In an agricultural implement, the combination with a tractor including a motor, of an attachment comprising a frame connected therewith to swing vertically about a longitudinal axis, a member projecting laterally from and connected with an end portion of said frame to swing vertically about an axis extending longitudinally of the implement, a soil tilling rig connected with said member to swing vertically, lifting devices for said rig comprising a jointed rock-shaft mounted on said frame and said member, and means connecting said rock-shaft with said rig to move the same vertically by the rocking of said rock-shaft, means adapted to be actuated by said motor to rock said rock-shaft, and means operable manually to rock said rock shaft.

51. In an agricultural implement, the combination with a tractor, of an attachment comprising a member extending laterally from the tractor and connected to swing vertically about a longitudinal axis, ground engaging means supporting said member, and connected to swing therewith, a soil tilling rig connected with said member to swing vertically, lifting means on said member connected with said rig and operable to lift the same, said lifting means being adapted to be actuated by means on the tractor, and means operable manually for vertically adjusting said rig independently of the actuation of said lifting means.

52. In an agricultural implement, the combination with a tractor including a motor, of an attachment comprising a frame connected therewith to swing vertically about a longitudinal axis, a member projecting laterally from and connected with an end portion of said frame to swing vertically about an axis extending longitudinally of the implement, a soil tilling rig connected with said member to swing vertically, lifting devices for said rig comprising a jointed rock-shaft mounted on said frame and said member, and means connecting said rock-shaft with said rig to move the same vertically by the rocking of said rock-shaft, means adapted to be actuated by said motor to rock said rock-shaft, and means operable manually to vertically adjust said rigs independently of the rocking of said rock-shaft.

53. In an agricultural implement, the combination with a tractor supported on propelling and steering wheels, and including actuating means, of a floating laterally extending member connected with the tractor to swing vertically about a longitudinal axis, a caster wheel supporting the outer end portion of said member, a cultivator rig connected with said member to swing vertically about a transverse axis, lifting devices on said member operable to move the rig vertically, and half revolution clutch mechanism connected with said lifting devices for operating the same, said clutch mechanism being adapted to be actuated by said actuating means on the tractor.

54. In an agricultural implement, the combination with a tractor supported on propelling and steering wheels, and including actuating means, of a floating laterally extending member connected with the tractor to swing vertically about a longitudinal axis, a caster wheel supporting the outer end portion of said member, a cultivator rig connected with said member to swing vertically about a transverse axis, a rock-shaft extending longitudinally of said member, lifting devices operable by said rock-shaft to move the rig vertically, and half revolution clutch mechanism for rocking said shaft, said clutch mechanism being adapted to be actuated by said actuating means.

55. In an agricultural implement, the combination with a tractor supported on propelling and steering wheels, and including actuating means, of a floating laterally extending member connected with the tractor to swing vertically about a longitudinal axis, a caster wheel supporting the outer end portion of said member, a cultivator rig connected with said member to swing vertically about a transverse axis, a rock-shaft extending longitudinally of said member, lifting devices operable by said rock-shaft to move the rig vertically, half revolution clutch mechanism for rocking said shaft, said clutch mechanism being adapted to be actuated by said actuating means, and manually operable means for rocking said shaft independently of the operation of said clutch mechanism.

56. In an agricultural implement, the combination with a tractor, of an attachment comprising a draft member extending laterally from the tractor and connected to swing vertically about a longitudinal axis, a rig connected with said member for vertical movement with respect thereto, and lifting means on said member connected with said rig and operable to lift the same, said lifting means being adapted to be actuated by means on the tractor.

57. In an agricultural implement, the combination with a tractor, of an attachment comprising a draft member extending laterally from the tractor and connected to swing vertically about a longitudinal axis, a rig connected with said member to swing vertically about a transverse axis, and lifting means on said member connected with said rig and operable to lift the same, including a rock shaft mounted on said draft member, said lifting means being adapted to be actuated by means on the tractor.

58. In an agricultural implement, the combination with a tractor including a motor, of an attachment comprising a draft member extending laterally from the tractor and connected to swing vertically about a longitudinal axis, an implement tool connected with said draft member to swing vertically about a transverse axis, and power lift mechanism adapted to be actuated by said motor to swing both said tool and said draft member vertically.

59. In an agricultural implement, the combination with a tractor including a motor, of an attachment comprising a draft member extending laterally from the tractor and connected to swing vertically about a longitudinal axis, an implement tool connected with said draft member for vertical movement, means for moving the tool vertically, and power lift mechanism adapted to be actuated by said motor to swing said draft member vertically and simultaneously to adjust the vertical position of said implement tool.

60. In an agricultural implement, the combination with a tractor including a motor, of an attachment comprising a member extending laterally from the tractor and connected to swing vertically about a longitudinal axis, a rig connected with said member for vertical movement, lifting means on said member connected with said rig and operable to lift the same, and power lift mechanism adapted to be actuated by said motor to operate said lifting means.

61. In an agricultural implement, the combination with a tractor including a motor, of an attachment comprising a member extending laterally from the tractor and connected to swing vertically about a longitudinal axis, a rig connected with said member for vertical movement, lifting means on said member connected with said rig and adapted to be operated manually by means on the tractor to lift said rig, and power lift mechanism adapted to be actuated by said motor to operate said lifting means.

62. In an agricultural implement, a main frame carrying power means, an attachment frame connected therewith to rock about a longitudinal axis, a draft member projecting laterally from and connected with said attachment frame to swing vertically about an axis extending generally longitudinally of the implement, an implement tool connected with said draft member for vertical movement, and lifting means connected with said tool and operable to lift the same, said lifting means being adapted to be actuated by said power means on the main frame.

63. In an agricultural implement, a main frame, an attachment frame connected therewith to rock about a longitudinal axis, a draft member projecting laterally from and connected with said attachment frame to swing vertically about its connection therewith, an implement tool connected with said draft member to be drawn thereby, and a ground engaging support for the outer portion of said draft member.

64. In an agricultural implement, a main frame, an attachment frame connected therewith to rock about a longitudinal axis, a draft member projecting laterally from and connected with said attachment frame to swing vertically about its connection therewith, an implement tool connected with said draft member to be drawn thereby, and means floatingly supporting the outer portion of said draft member.

65. In an agricultural implement, a main frame, an attachment frame connected therewith to rock about a longitudinal axis, a draft member projecting laterally from and connected with said attachment frame to swing vertically about its connection therewith, an implement tool connected with said draft member to be drawn thereby, lifting means mounted on said draft member and operable from the main frame to lift said tool, and means floatingly supporting the outer portion of said draft member.

66. In an agricultural implement, a main frame, an attachment frame connected therewith to rock about a longitudinal axis, a draft member projecting laterally from and connected with said attachment frame to swing vertically about its connection therewith, an implement tool connected with said draft member to be drawn thereby, lifting means mounted on said draft member and operable from the main frame to lift said tool, and means on the main frame operable to swing said draft member vertically.

67. In an agricultural implement, the combination with a main frame of an attachment comprising an attachment frame connected therewith to rock about a longitudinal axis, a draft member projecting laterally from and connected with said attachment frame to swing vertically about its connection therewith, an implement tool connected with said draft member for vertical movement with respect thereto, lifting means on said draft member for lifting said tool, means on the main frame for actuating said lifting means, and means for floatingly supporting the outer portion of said draft member.

68. In an agricultural implement, the combination with a tractor including a motor, of an attachment comprising a frame connected with the tractor to rock about a generally longitudinal axis, a member projecting laterally from, and connected with, said frame to swing vertically about an axis extending generally longitudinally of the implement, an implement tool connected with said member to move vertically with respect thereto, and power lift mechanism adapted to be actuated by said motor comprising lifting means connected with said tool and operable to lift the same.

69. In an agricultural implement, the combination with a tractor including a motor, of an attachment comprising a frame connected with the tractor to rock about a generally longitudinal axis, a member projecting laterally from, and connected with, said frame to swing vertically about an axis extending generally longitudinally of the implement, an implement tool connected with said member for vertical movement with respect thereto, lifting means on said member operable to lift said tool, and power lift mechanism adapted to be actuated by said motor and operatively connected with said lifting means.

70. In an agricultural implement, the combination with a tractor including a motor, of an attachment comprising a frame connected with the tractor to rock about a generally longitudinal axis, a member projecting laterally from, and connected with, said frame to swing vertically about an axis extending generally longitudinally of the implement, an implement tool connected with said member, and means adapted to be actuated by the motor to swing said member vertically.

71. An attachment for tractors having rear traction and front steering wheels, comprising a transverse centrally disposed frame member supported at the front of the tractor, rigs connected with said member to cultivate a row straddled by the traction wheels, a floating draft member hinged to one end portion of said frame member to swing vertically, a ground engaging support for the outer end portion of said member, and rigs connected with said draft member and arranged to cultivate a row lying beyond the path of the traction wheels.

72. An attachment for tractors having rear traction and front steering wheels, comprising a transverse centrally disposed frame member supported at the front of the tractor, rigs connected with said member to cultivate a row straddled by the traction wheels, floating draft members hinged to opposite end portions of said frame member to swing vertically independently of each other, means floatingly supporting the outer end portions of said draft members, and rigs connected with said draft members and arranged to cultivate rows lying beyond the path of the traction wheels.

73. An attachment for tractors having rear traction and front steering wheels, comprising a transverse centrally disposed frame member supported at the front of the tractor, rigs connected with said member to cultivate a row straddled by the traction wheels, floating draft members hinged to opposite end portions of said frame member to swing vertically independently of each other, means floatingly supporting the outer end portions of said draft members, rigs connected with said draft members and arranged to cultivate rows lying beyond the path of the traction wheels, and means operable from the tractor to simultaneously lift said rigs.

74. An attachment for tractors having rear traction and front steering wheels, comprising a transverse centrally disposed frame member supported at the front of the tractor, rigs connected with said member to cultivate a row straddled by the traction wheels, floating draft members hinged to opposite end portions of said frame member to swing vertically independently of each other, means floatingly supporting the outer end portions of said draft members, rigs connected with said draft members and arranged to cultivate rows lying beyond the path of the traction wheels, and means operable from the tractor to simultaneously lift said floating draft members.

75. A convertible multiple row cultivating implement comprising a tractor having traction and steering wheels, an intermediate member connected with the tractor between the paths of the traction wheels, and tools connected with said member to cultivate the soil between the latter wheels, combined with floating tool carrying members adapted to be hingedly connected with the tractor at opposite sides thereof, to swing vertically, and to extend laterally therefrom beyond the treads of the traction wheels, respectively, ground engaging supports carried by said floating members, and cultivating tools operatively connected with each of said floating members for cultivating rows lying outside of the path of the tractor.

76. A convertible multiple row cultivating implement comprising a tractor having traction and steering wheels, an intermediate member connected with the tractor between the paths of the traction wheels to rock about a longitudinal axis, and tools connected with said member to cultivate the soil between the latter wheels, combined with floating tool carrying members adapted to be hingedly connected with the tractor at opposite sides thereof, to swing vertically, and to extend laterally therefrom beyond the treads of the traction wheels, respectively, cultivating tools operatively connected with each of said floating members for cultivating rows lying outside of the path of the tractor, and means for limiting the downward movement of said floating members to prevent excessive penetration of said cultivating tools.

77. A multiple row cultivating implement comprising a tractor having traction and steering wheels, an intermediate member connected with the tractor between the paths of the traction wheels, and tools connected with said member to cultivate the soil between the traction wheels, combined with floating tool carrying members adapted to be hingedly connected with said intermediate member at opposite sides thereof to swing vertically, and to extend laterally therefrom beyond the treads of the traction wheels, respectively, ground engaging supports carried by said floating members, and cultivating rigs connected with each of said floating members to swing vertically with respect thereto, for cultivating rows lying outside the path of the tractor.

78. A multiple row cultivating implement comprising a tractor having traction and steering wheels, an intermediate member connected with the tractor between the paths of the traction wheels, and tools connected with said member to cultivate the soil between the traction wheels, combined with floating tool carrying members adapted to be hingedly connected with said intermediate member at opposite sides thereof to swing vertically, and to extend laterally therefrom beyond the treads of the traction wheels, respectively, ground engaging supports carried by said floating members, cultivating rigs connected with each of said floating members to swing vertically with respect thereto, for cultivating rows lying outside the path of the tractor, and lifting means mounted on said floating members operable from the tractor to lift said rigs.

79. The combination with a tractor having traction and steering wheels, of a member mounted centrally on the tractor, cultivating tools carried by said member and adapted to cultivate the space between the treads of the traction wheels, a freely floating cultivating tool carrying member extending laterally from one side of the tractor beyond the tread of the adjacent traction wheel and having hinged connection with the tractor for vertical movement, a ground engaging support for the outer portion of said floating member, and a pair of cultivating rigs operatively connected with the latter member between said ground engaging support and the tractor, for cultivating a row lying outside the path of the tractor.

80. The combination with a tractor having traction and steering wheels and including a motor, of a member mounted centrally on the tractor, cultivating tools carried by said member and adapted to cultivate the space between the treads of the traction wheels, a freely floating cultivating tool carrying member extending laterally from one side of the tractor beyond the tread of the adjacent traction wheel and having hinged connection with the tractor for vertical movement, a ground engaging support for the outer portion of said floating member, a pair of cultivating rigs operatively connected with the latter member between said ground engaging support and the tractor, for cultivating a row lying outside the path of the tractor, lifting means mounted on said floating member and connected with said rigs, and means for actuating said lifting means from said motor.

81. The combination with a tractor having traction and steering wheels, and including a motor, of a freely floating implement tool carrying member extending laterally from one side of the tractor beyond the tread of the adjacent traction wheel and having hinged connection with the tractor for vertical movement, means floatingly supporting said tool carrying member, a pair of cultivating rigs operatively connected with said member and positioned to cultivate a row lying outside the path of the tractor, devices carried by said floating member operable to lift the tools connected therewith, and connections for actuating said lifting devices by power from the tractor motor.

82. In a multiple row agricultural implement the combination with a tractor having traction and steering wheels, floating draft frames adapted to be separately connected with the opposite sides of the tractor to swing vertically independently of each other, each of said frames comprising a single rigid transversely disposed draft bar, and a diagonally disposed rigid brace connected at its outer end portion with the outer portion of said draft bar, said bars being adapted to extend laterally from the tractor beyond the treads of the traction wheels forming therewith a V-shaped frame, means pivotally connecting the spaced inner ends of said draft bar and brace with the tractor to swing vertically about a generally longitudinal axis, ground engaging supports for the outer end portions of said draft frames, and implement tools operatively connected with said draft bars.

83. In a multiple row agricultural implement the combination with a tractor having traction and steering wheels, floating draft frames adapted to be separately connected with the opposite sides of the tractor to swing vertically independently of each other, and to extend laterally therefrom beyond the treads of the traction wheels, respectively, each of said frames comprising a transversely disposed draft bar, and a diagonally disposed rigid brace connected at its outer end portion with the outer portion of said draft bar, forming therewith a V-shaped frame, means pivotally connecting the spaced inner ends of said draft bar and brace with the tractor to swing vertically about a longitudinal axis, ground engaging supports for the outer end portions of said draft frames, implement tools connected with said draft bars for vertical movement with respect thereto, and connections operable from the tractor and including parts reacting against said draft frames for lifting said tools.

84. In a multiple row cultivating implement the combination with a tractor having traction and steering wheels including a motor, floating draft frames adapted to be separately connected with the opposite sides of the tractor to swing vertically independently of each other, and to extend laterally therefrom beyond the treads of the traction wheels, respectively, each of said frames comprising a transversely disposed draft bar at the front thereof, and a diagonally disposed rigid brace connected at its outer end portion with the outer portion of said draft bar, forming therewith a V-shaped frame, means pivotally connecting the spaced inner ends of said draft bar and brace with the tractor to swing vertically about a longitudinal axis, ground engaging supports for the outer end portions of said draft frames, cultivating rigs operatively connected with said draft bars, lifting devices for said rigs mounted on said draft frames, and connections for actuating said lifting devices from said motor.

85. In a multiple row cultivating implement the combination with a tractor having traction and steering wheels including a motor, floating draft frames adapted to be separately connected with the opposite sides of the tractor to swing vertically independently of each other, and to extend laterally therefrom beyond the treads of the traction wheels, respectively, each of said frames comprising a transversely disposed draft bar at the front thereof, and a diagonally disposed rigid brace connected at its outer end portion with the outer portion of said draft bar, forming therewith a V-shaped frame, means pivotally connecting the spaced inner ends of said draft bar and brace with the tractor to swing vertically about a longitudinal axis, supports for the outer end portions of said draft frames, cultivating rigs operatively connected with said draft bars for vertical movement relative thereto, and means operable from the tractor motor for vertically swinging said draft frames and simultaneously shifting said rigs relative to the draft bars.

86. In an agricultural implement, the combination with a tractor including a motor, of an attachment comprising a draft member projecting laterally from and connected with the tractor to swing vertically about an axis extending longitudinally of the implement, a soil tilling rig connected with said draft member to move vertically, lifting devices for said rig comprising a jointed rock shaft having an outer portion mounted on said draft member and an inner portion carried by the tractor, the joint of said rock shaft being substantially alined with the axis about which said draft member swings, means connecting the outer portion of said rock shaft with the rig for moving the same vertically by the rocking of said shaft, and means connected with the inner portion of said rock shaft for rocking the same from the tractor.

87. In an agricultural implement, the combination with a tractor including a motor, of an attachment comprising a draft member projecting laterally from and connected with the tractor to swing vertically about an axis extending longitudinally of the implement, a soil tilling rig connected with said draft member to move vertically, lifting devices for said rig comprising a jointed rock shaft having an outer portion mounted on said draft member and an inner portion carried by the tractor, the joint of said rock shaft being substantially alined with the axis about which said draft member swings, means connecting the outer portion of said rock shaft with the rig for moving the same vertically by the rocking of said shaft, and means connected with the inner portion of said rock shaft for rocking the same from the tractor motor.

88. In an agricultural implement, the combination with a tractor including a motor, of an attachment comprising a draft member projecting laterally from and connected with the tractor to swing vertically about an axis extending longitudinally of the implement, a soil tilling rig connected with said draft member to move vertically, lifting devices for said rig comprising a jointed rock shaft having an outer portion mounted on said draft member and an inner portion carried by the tractor, the joint of said rock shaft being substantially alined with the axis about which said draft member swings, means connecting the outer portion of said rock shaft with the rig for moving the same vertically by the rocking of said shaft, and means connected with the inner portion of said rock shaft for rocking the same alternatively either by power from the tractor motor or manually.

89. In an agricultural implement, the combination with a tractor including a motor, of an attachment comprising a draft member projecting laterally from and connected with the tractor to swing vertically about an axis extending longitudinally of the implement, a soil tilling rig connected with said draft member to move vertically, lifting devices for said rig comprising a jointed rock shaft having an outer portion mounted on said draft member and an inner portion carried by the tractor, the joint of said rock shaft being substantially alined with the axis about which said draft member swings, means connecting the outer portion of said rock shaft with the rig for moving the same vertically by the rocking of said shaft, and half revolution clutch mechanism connected with the inner portion of said rock shaft for rocking the same by power from the tractor motor.

90. In an agricultural implement, the combination with a tractor including a motor, of an attachment comprising draft members projecting laterally at opposite sides of the tractor to swing vertically independently of each other about axes extending longitudinally of the implement, implement tools connected with said draft members to move vertically, lifting means for said tools comprising a jointed rock shaft having outer portions mounted on said draft members respectively and an inner portion carried by the tractor, the joints of said rock shaft being respectively substantially alined with the axes about which said draft members swing, means connecting the outer portions of said rock shaft with said tools for moving the same vertically by the rocking of said rock shaft, and means connected with the inner portion of said rock shaft for rocking the same by power from the tractor motor.

91. The combination with a tractor including a motor, of a frame comprising a draft member extending laterally from the tractor, a rock shaft journaled on said member and extending longitudinally thereof, a rig connected with said draft member and adapted to be lifted by the rocking of said rock shaft, a second rock shaft flexibly connected to the first rock shaft and having an arm, a half revolution clutch operated by the tractor motor, said clutch having a crank, and a rod connecting said crank with the arm on the second rock shaft.

92. The combination with a tractor including a motor, of a cultivator frame comprising draft members extending laterally beyond opposite sides of the tractor, a lifting rock shaft journaled on each draft member, rigs connected with said draft members and adapted to be lifted by the rocking of said rock shafts respectively, a third rock shaft flexibly connected with each of said lifting rock shafts and having an arm, a half revolution clutch operated by the tractor motor, said clutch having a crank, and a rod connecting said crank with the arm on the third rock shaft.

93. The combination with a tractor including a motor, of a frame comprising a draft member extending laterally from the tractor, a rock shaft journaled on said draft member and extending longitudinally thereof, a second rock shaft flexibly connected with the first rock shaft and having an arm, a half revolution clutch operated by the tractor motor, said clutch having a crank, an operating rod connected with said arm, and connections for operating said rod alternatively, either by said crank or manually from the tractor.

94. In an agricultural implement, the combination with a tractor including a motor, of an attachment comprising draft members extending laterally beyond opposite sides of the tractor, and connected therewith to swing vertically, rigs connected with said draft members, a lifting rock shaft journaled on each draft member for lifting the rig connected therewith, an intermediate rock shaft supported on the tractor and flexibly connected with said rock shafts, an arm on said intermediate rock shaft, a half revolution clutch operated by the tractor motor and provided with a crank, and an actuating rod connecting said crank with said arm.

95. In an agricultural implement, the combination with a tractor including a motor, of an attachment comprising draft members extending laterally beyond opposite sides of the tractor, rigs connected with said draft members, a lifting rock shaft journaled on each draft member for lifting the rig connected therewith, an intermediate rock shaft supported on the tractor and flexibly connected with said rock shafts, an arm on said intermediate rock shaft, a half revolution clutch operated by the tractor motor and provided with a crank, an actuating rod connecting said crank with said arm, and connections for actuating said rod either by rotation of said crank or manually from the tractor.

96. The combination with a tractor including a motor, of a frame comprising draft members extending laterally from opposite sides of the tractor and rigs supported therefrom, the draft members and rigs at one side being free to move vertically independently with respect to those at the other side, whereby said rigs may accommodate themselves to undulations of the ground surface, a half revolution clutch operated by the tractor motor, and lifting mechanism connecting said clutch with said rigs including flexible connections to permit the aforesaid independent movement of said draft members and rigs.

97. In an agricultural implement, the combination with a tractor, of an attachment comprising a draft member extending laterally from the tractor and connected to swing vertically about a generally longitudinal axis, at least one rig connected with said member for vertical movement with respect thereto, means for supporting the outer end of the laterally extending draft member, and lifting means on said member connected with said rig and operable to lift the same, said lifting means being adapted to be actuated by means on the tractor.

98. In an agricultural implement, the combination with a tractor, of an attachment comprising a draft member extending laterally from the tractor and connected to swing vertically about a generally longitudinal axis, at least one rig connected with said member for vertical movement with respect thereto, means for limiting the downward movement of the draft member but permitting independent upward movement thereof, and lifting means on said member connected with said rig and operable to lift the same, said lifting means being adapted to be actuated by means on the tractor.

99. In an agricultural implement, the combination with a tractor, of an attachment comprising a draft member extending laterally from the tractor and connected to swing vertically about a generally longitudinal axis, at least one rig connected with said member for vertical movement with respect thereto, means acting as a stop effective in one direction only for limiting the downward movement of the draft member but permitting independent upward movement thereof, and lifting means on said member connected with said rig and operable to lift the same, said lifting means being adapted to be actuated by means on the tractor.

100. In an agricultural implement, the combination with a tractor including a motor, of an attachment comprising a member extending laterally from the tractor and connected to move generally vertically with respect to the tractor, means on the tractor for limiting the downward movement of said laterally extending member, a rig connected with said member for vertical movement relative thereto, lifting means on said member connected with said rig and operable to lift the same, and power lift mechanism carried by the tractor and adapted to be actuated by said motor to operate said lifting means.

101. In an agricultural implement, the combination with a tractor including a motor, of an attachment comprising a member extending laterally from the tractor and connected to swing vertically about a generally longitudinal axis, means for limiting the downward movement of said member, a rig connected with said member for vertical movement, lifting means on said member connected with said rig and adapted to be operated manually by means on the tractor to lift said rig, and power lift mechanism adapted to be actuated by said motor to operate said lifting means.

102. In an agricultural implement, the combination with a tractor including a motor, of an attachment comprising a member extending laterally from the tractor and connected to swing vertically about a generally longitudinal axis, means for supporting the outer end of said member to limit the downward movement thereof but providing for upward movement thereof relative to the tractor, a rig connected with said member for vertical movement, lifting means on said member connected with said rig and adapted to be operated manually by means on the tractor to lift said rig, and power lift mechanism adapted to be actuated by said motor to operate said lifting means.

103. A convertible multiple row cultivating implement comprising a tractor having traction and steering wheels, an intermediate member connected with the tractor between the paths of the traction wheels, and tools connected with said member to cultivate the soil between the latter wheels, combined with floating tool carrying members adapted to be hingedly connected with the tractor at opposite sides thereof, to swing vertically, and to extend laterally therefrom beyond the treads of the traction wheels, respectively, means limiting the downward movement of said floating members, and cultivating tools operatively connected with each of said floating members for cultivating rows lying outside of the path of the tractor.

104. The combination with a tractor having traction and steering wheels, and including a motor, of a freely floating implement tool carrying member extending laterally from one side of the tractor beyond the tread of the adjacent traction wheel and having hinged connection with the tractor for vertical movement, means carried by the tractor for limiting the downward swinging movement of said tool carrying member, a pair of cultivating rigs operatively connected with said member and positioned to cultivate a row lying outside the path of the tractor, devices carried by said floating member operable to lift the tools connected therewith, and connections for actuating said lifting devices by power from the tractor motor.

105. The combination with a tractor including a motor, of a frame comprising a draft member extending laterally from the tractor, a rock shaft journaled on said member and extending longitudinally thereof, a rig connected with said draft member and adapted to be lifted by the rocking of said rock shaft, a second rock shaft flexibly connected to the first rock shaft and having an arm, and power operated lifting mechanism actuated by the tractor motor and connected with said arm to operate said first rock shaft.

106. The combination with a tractor including a motor, of a cultivator frame comprising draft members extending laterally beyond opposite sides of the tractor, a lifting rock shaft journaled on each draft member, rigs connected with said draft members and adapted to be lifted by the rocking of said rock shafts respectively, a third rock shaft flexibly connected with each of said lifting rock shafts and having an arm, and lifting mechanism operated by the power of the tractor motor and connected with said arm to actuate said first rock shaft.

107. The combination with a tractor including a motor, of a frame comprising a draft member extending laterally from the tractor, a rock shaft journaled on said draft member and extending longitudinally thereof, a second rock shaft flexibly connected with the first rock shaft and having an arm, lifting mechanism actuated by the power of the tractor motor and including an operating member, an operating rod connected with said arm, and connections for operating said rod alternatively, either by said operating member or manually from the tractor.

108. In an agricultural implement, the combination with a tractor including a motor, of an attachment comprising draft members extending laterally beyond opposite sides of the tractor, and connected therewith to swing vertically, rigs connected with said draft members, a lifting rock shaft journaled on each draft member for lifting the rig connected therewith, an intermediate rock shaft supported on the tractor and flexibly connected with said rock shafts, an arm on said intermediate rock shaft, lifting mechanism operated by the tractor motor and provided with a crank, and an actuating rod connecting said crank with said arm.

109. In an agricultural implement, the combination with a tractor including a motor, of an attachment comprising draft members extending laterally beyond opposite sides of the tractor, rigs connected with said draft members, a lifting rock shaft journaled on each draft member for lifting the rig connected therewith, an intermediate rock shaft supported on the tractor and flexibly connected with said rock shafts, an arm on said intermediate rock shaft, lifting mechanism operated by the tractor motor and provided with a crank, an actuating rod connecting said crank with said arm, and connections for actuating said rod either by rotation of said crank or manually from the tractor.

110. The combination with a tractor including a motor, of a frame comprising draft members extending laterally from opposite sides of the tractor and rigs supported therefrom, the draft members and rigs at one side being free to move vertically independently with respect to those at the other side, whereby said rigs may accommodate themselves to undulations of the ground surface, a lifting mechanism operated by the power of the tractor motor, and means connecting said mechanism with said rigs including flexible connections to permit the aforesaid independent movement of said draft members and rigs.

111. The combination with a tractor, of a cultivating attachment connected with the tractor and comprising an intermediate frame section and two outer frame sections, a plurality of cultivating rigs pivotally mounted on said intermediate and outer frame sections, a lifting shaft extending transversely across said attachment, and means operatively connecting said lifting shafts with each of said rigs, said shaft being divided into separable intermediate and outer shaft sections mounted respectively on said intermediate and outer frame sections, said outer frame sections together with the rigs and shaft sections mounted thereon being removable as units from said intermediate frame sections.

112. The combination with a tractor, of a cultivating attachment connected with the tractor and comprising a transverse frame bar, a transverse rock shaft on said frame bar, extension frame bars adapted to extend outwardly from the ends of said transverse frame bar, separable coupling members on said transverse frame bar and on said extension frame bars adapted to detachably couple said bars together, rock shaft extensions mounted on said extension frame bars, means for releasably coupling said rock shaft extensions with said transverse rock shaft, cultivating rigs pivotally mounted on said transverse frame bar and on said extension frame bars, and lifting arms on said transverse rock shaft and on said rock shaft extensions operatively connected with said cultivating rigs.

113. The combination with a tractor, of a cultivating attachment connected with the tractor and comprising two interconnected frame sections, a plurality of cultivating rigs movably carried by said sections, a lifting shaft extending transversely across said frame sections, and means operatively connecting said lifting shaft with each of said rigs, said shaft being divided into separable shaft sections mounted respectively on said frame sections, one of said frame sections together with the rigs and shaft section mounted thereon being removable as a unit from the tractor and from the other frame section.

THEOPHILUS BROWN.